Nov. 13, 1923.　　　　　　　　　　　　　　　　　　1,474,279
J. E. MINNER
TRANSMISSION MECHANISM
Filed June 23, 1922　　2 Sheets-Sheet 1
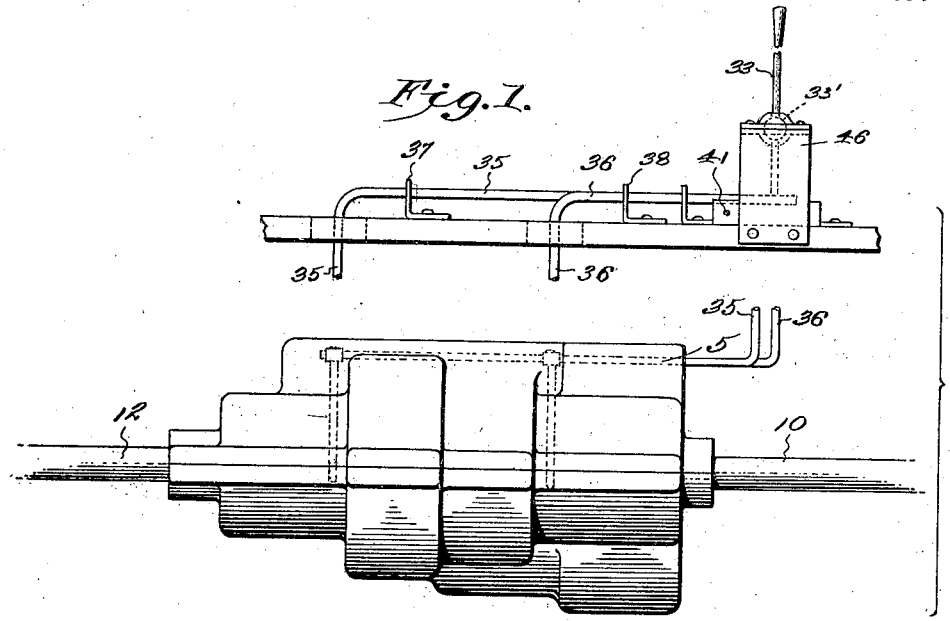
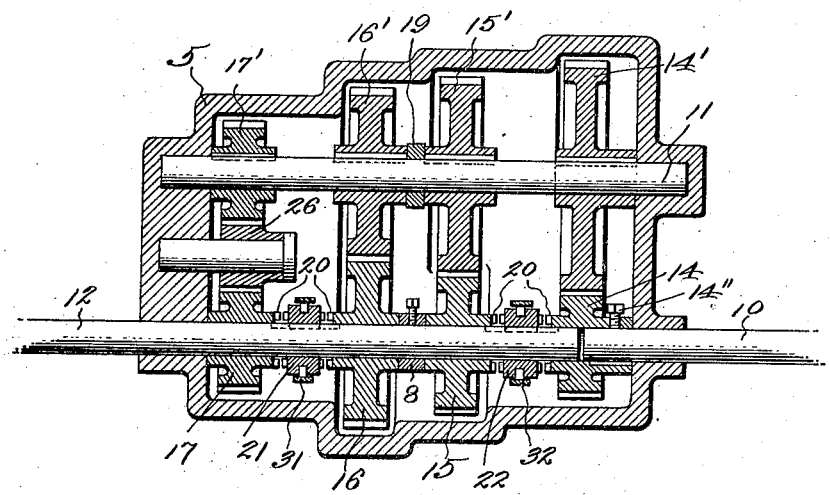
J. E. Minner,
INVENTOR
BY Victor J. Evans
ATTORNEY
WITNESSES Nov. 13, 1923.
J. E. MINNER
1,474,279
TRANSMISSION MECHANISM
Filed June 23, 1922   2 Sheets-Sheet 2
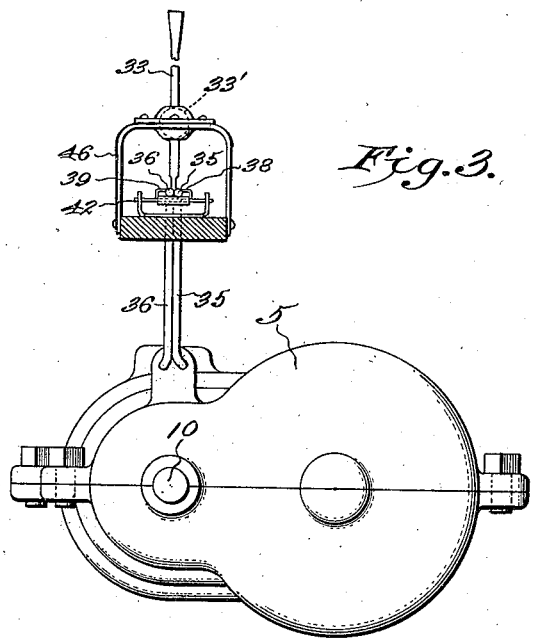
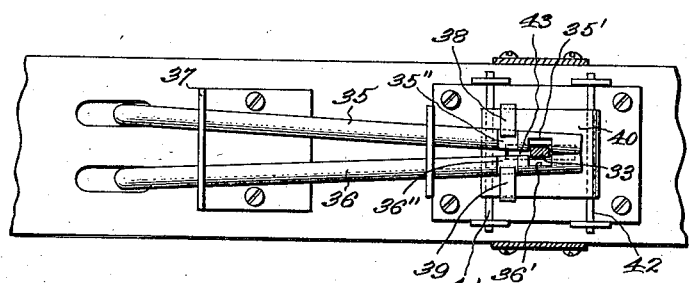
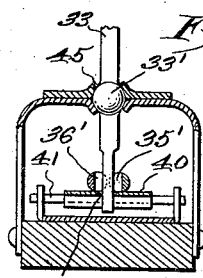
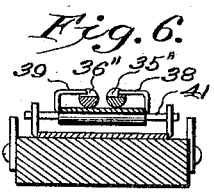
J. E. Minner,
INVENTOR
BY Victor J. Evans
ATTORNEY Patented Nov. 13, 1923.

1,474,279

UNITED STATES PATENT OFFICE.

JULIAN E. MINNER, OF MANDAN, NORTH DAKOTA.

TRANSMISSION MECHANISM.

Application filed June 23, 1922. Serial No. 570,512.

*To all whom it may concern:*

Be it known that I, JULIAN E. MINNER, a citizen of the United States, residing at Mandan, in the county of Morton and State of North Dakota, have invented new and useful Improvements in Transmission Mechanism, of which the following is a specification.

The object of this invention is to provide a type of transmission in which the gear wheels are continuously in mesh, and a change of speed may be produced by effecting engagement between one of the gears of a given pair and the shaft to be driven, or directly between the driving shaft and the driven shaft, without throwing out the main clutch.

A further object is to provide a transmission mechanism in which the driving shaft carries a rigidly mounted gear wheel constantly imparting movement to a gear wheel keyed on a countershaft, the latter also having keyed thereon one gear wheel of each of the remaining pairs employed in the mechanism, and to provide in connection with the foregoing a driven shaft carrying loosely mounted gear wheels with means for locking any one of these gear wheels to the driven shaft.

A still further object is to provide an interlocking device preventing the engagement of more than one pair of gear wheels at the same time.

A still further object is to provide an interlocking device including a plurality of controlling rods, a lever mounted for universal movement, and a transversely slidable element carrying engaging devices for retaining either rod against movement while the other is being shifted.

With the foregoing and other objects in view, the invention consists in the novel construction and arrangement of elements described, illustrated and claimed, it being understood that modifications may be made within the scope of the claim without departing from the spirit of the invention.

In the drawings, Figures 1 is a view of the structure in elevation, the controlling elements being detached from the transmission case; Figure 2 is a longitudinal section through the transmission mechanism; Figure 3 is an end elevation of the structure of Figure 1; Figure 4 is a plan view of the upper structure of Figure 3; Figure 5 is a detail in section showing the cooperation of the hand lever with the recessed portions of the longitudinal rods 35, 36, of Figure 4; Figure 6 shows holding elements engaging other recessed portions of these rods.

The casing of the transmission mechanism is designated 5, the driving shaft shown at 10, the countershaft at 11 and the driven shaft at 12.

A gear wheel 14 is keyed on the shaft 10 and is retained against longitudinal movement by a set screw 14". The gear 14 is normally loose with reference to the shaft 12, and this shaft also carries loosely mounted thereon gear wheels 15, 16 and 17. Collars 18 and 19 serve an obvious purpose. The gear wheels or the hubs thereof are provided with clutch or toothed surfaces 20, to be engaged by the complementary clutch elements 21 and 22. These devices last named have teeth on opposite sides thereof and are adapted to lock the adjacent gear wheels to the shaft 12, it being understood that the devices 21 and 22 are splined to the shaft 12.

Countershaft 11 carries gear wheels 14', 15', 16' and 17' meshing with the oppositely located gear wheels on the shafts 10 and 11. The gear wheels 14', 15', 16' and 17' are keyed to the shaft 11, and are driven through the gear wheel 14 keyed to the driving shaft 10.

The gear wheel 17' meshes with an idler 26, and the latter meshes with the gear wheel 17, for producing reverse movement of the driven shaft.

It will be observed that all of the gear wheels are in constant motion, and thus by the proper shift of the controlling mechanism, the clutch elements 21 and 22 are thrown into position for effecting the required change of speed, one of the clutch elements being active at a time, to the exclusion of the other. By throwing the clutch element 22 to the right, motion is imparted directly from the driving shaft 10 to the shaft 12. By throwing the clutch element 22 to the left, the gear wheel 15 is locked to the shaft 12 and movement is imparted thereto through the gear wheel 15', shaft 11, gear wheel 14', gear wheel 14, the latter being keyed to the driving shaft. This provides for the intermediate speed.

Low speed is provided through gear wheels 16 and 16', by locking the former to the shaft 12. For the reverse drive, the clutch element 21 is thrown to the left and the shaft 12 is rotated through the gear wheels 17, 26, 17'.

Clutch elements 21 and 22 are controlled by the yokes 31 and 32, and I provide a particular interlocking device including a lever 33 which, when in neutral position prevents the shifting of the gears accidentally, and which is designed to prevent the shifting of more than one gear wheel at a time, it being necessary to throw one set out of mesh before the gear wheels of another set are caused to mesh. The rods 35 and 36 are mounted for longitudinal movement in brackets, such as 37 and 38. Each rod is provided with a cutaway portion or recess, these recesses being designated 35' and 36' and facing each other. Each rod is further provided with a recess 35" or 36", as the case may be, and these recesses last named are engaged by the inwardly extending lugs 38 and 39 mounted on the slide 40 which is movable transversely with reference to the rods 25 and 26. Transverse rods or bars 41 and 42 provide means for mounting this slide, and the latter is provided with a slot 43 engaged by the end of the lever 33, the lever passing through the opening formed by the oppositely located recesses 35' and 36'.

Lever 33 is provided with a ball member 33' operating in a socket 45 formed in one element of the frame or bracket 46. This provides for substantially universal movement of the lever 33.

When the lever is in neutral position the lugs 38 and 39 engage the walls of recesses 35" and 36" and prevent the movement of either rod 35 or 36 and therefore prevent movement of the yokes and clutch members controlled by these rods. By imparting a sidewise movement to the lever 33, and then a movement in a direction at right angles to the movement first named the lower end of the lever engages the wall of the slotted portion 43 of the slide 40, and causes the slide to move laterally for the purpose of freeing one of the rods 35 or 36 from the lug previously engaging the wall of the recess therein. The lever 33 also positively engages the wall of the recess 35' or 36', as the case may be, and the movement of the lever in the required direction, imparts longitudinal movement to the rods 35 or 36 and to the yokes, and therefore to the elements.

What is claimed is:

In a device of the class described, a plurality of rods for shifting clutch yokes, said rods being provided with recesses oppositely located, a lever for universal movement about its pivotal point, one end of the lever engaging the walls of the recessed portions, a transversely movable slide having a slot therein engaged by the end of the lever, said rods being provided with additional recesses oppositely located, and lugs carried by said slide and cooperating with the recesses last named, said lugs extending toward each other over the rods and spaced to permit partial engagement of both rods, and free longitudinal movement of either rod upon transverse movement of the slide by the lever.

In testimony whereof I affix my signature.

JULIAN E. MINNER.